United States Patent [19]

Lofink

[11] 4,406,163
[45] Sep. 27, 1983

[54] POSITIVE DISPLACEMENT VOLUMETRIC COMPRESSIBLE FLUID METER

[76] Inventor: Joseph P. Lofink, 979 Lake Shore Dr., Hebron, Ohio 43205

[21] Appl. No.: 340,288

[22] Filed: Jan. 18, 1982

[51] Int. Cl.³ ............................................. G01F 15/10
[52] U.S. Cl. ........................................ 73/274; 73/201
[58] Field of Search ................ 73/198, 201, 263, 264, 73/265, 266, 267, 269, 270, 273, 274

[56] References Cited

U.S. PATENT DOCUMENTS

| 2,815,661 | 12/1957 | Wetzel | 73/273 |
| 4,007,635 | 2/1977 | Friebel | 73/273 |
| 4,109,525 | 8/1978 | Kolb et al. | 73/201 |
| 4,281,541 | 8/1981 | Strengowski | 73/264 |

OTHER PUBLICATIONS

Singer American Meter Division, American AL-250 Aluminumcase Meter, Bulletin 301.4, May 1976.
Singer American Meter Division, Metering for Energy Management, Bulletin 352.1, p. 4, Nov. 1977.

*Primary Examiner*—Herbert Goldstein
*Attorney, Agent, or Firm*—Millard & Cox

[57] ABSTRACT

To measure low volumes of gas flow in high-pressure systems a conventional gas meter is incorporated within a high-pressure container. Connections from inside the high-pressure container are connected to a warning system outside the container to alert the operator when too great a volume of gas is flowing through the meter and a restriction of the size of the outlet to the heavy-duty container prevents the damage to the meter which is designed to measure small volumes and is relatively delicate.

12 Claims, 8 Drawing Figures

POSITIVE DISPLACEMENT VOLUMETRIC COMPRESSIBLE FLUID METER

FIELD OF THE INVENTION

This invention is a positive displacement volumetric compressible fluid meter designed to achieve an economic means for measuring extremely small volumes of gas at relatively high pressures.

BACKGROUND OF THE INVENTION

Presently the most accurate methods of measuring small volumes of gas is with the use of a small displacement type meter, typical of the ones used to measure gas consumed by domestic households. The typical gas meter for a household is not designed to physically withstand high pressure gas. Meters available in the marketplace which are designed to physically withstand high internal pressures are not capable of measuring extremely small amounts of gas (for example 0.2 cubic feet of gas per hour).

SUMMARY OF THE INVENTION

The meter and the environment in which it is embodied as defined by this invention is intended to accurately measure small amounts of gas at pressures in excess of thirty pounds per square inch absolute. The high pressure limits are restricted only by the availability of suitable materials for the containment chamber which are virtually unlimited.

The apparatus herein disclosed is designed to accurately measure the volume of hydrogen gas at high pressure which passes into the system over a period of time. Such gas is used to cool the generating units employed in electrical generating power plants and it is known to leak to the atmosphere in the power station buildings, thereby creating an extremely hazardous condition. Thus, it is important to know the rate at which the hydrogen gas is leaking from the generating unit as well as the total leakage over a given period of time. The meter of this invention is installed between the high-pressure hydrogen source and the generating unit itself and the meter will indicate the exact amount of hydrogen leaking from the generator unit or units.

The apparatus disclosed herein is designed to receive registers of various kinds which may indicate the total amount of gas which has leaked from the generator and/or indicating equipment which will show the instantaneous flow rates and possibly give a visual or audible alarm when a predetermined amount of hydrogen has passed through the meter in a given period of time. The indicating and alarm apparatus may be mounted directly to the meter housing or at a remote station employing the use of electrical impulses adaptable to the meter.

Other possible applications for this invention include measuring high-pressure natural gas when used as a substitute fuel for gasoline or oil in commercial or private vehicles. With the shortage of crude oil and the high price of gasoline, natural gas is an attractive fuel substitute in some instances. To minimize wieght and to save space the natural gas may be stored on board the vehicle in small containers at extremely high pressure (up to 3,000 psig). These containers are replaceable and can be either exchanged or recharged when needed. This invention can be used for the measurement of the gas when the tanks are charged or when the gas is transferred from high-pressure storage tanks to the portable container.

The key to this invention is housing the unit which is inherently capable of measuring extremely small amounts of a compressible fluid within a chamber or container which is designed to accommodate high-pressure differentials between the internal and external walls of the chamber. The small sensitive measuring module and housing therefore is encompassed within a containment chamber capable of withstanding high pressure and this achieves a unique pressure equalization system wherein the pressure surrounding the housing of the measuring module is substantially the same of the internal part of the module, even though the pressure outside the containment chamber is much lower than the interior pressure. This feature achieves pressure equalization across the fragile measuring module, thereby permitting the positive displacement unit to function in a normal manner regardless of the actual elevated pressure of fluid passing therethrough.

DESCRIPTION OF THE PREFERRED EMBODIMENT

Figure 1:
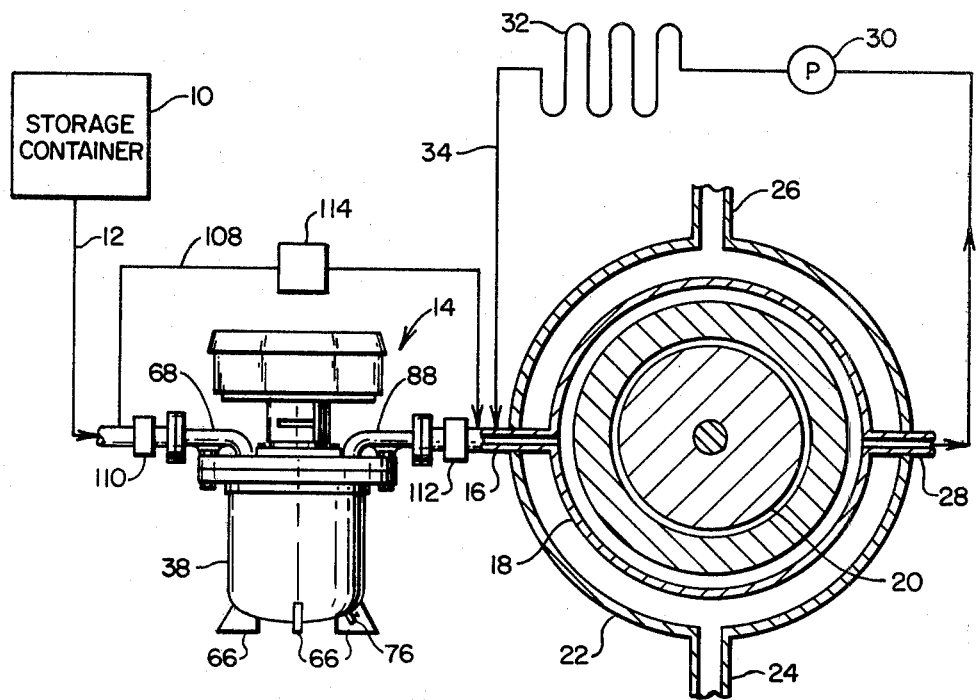
FIG. 1 is a schematic illustration of the combination into which the measuring apparatus would be incorporated.

In the preferred embodiment the measuring apparatus involved is combined with the cooling system for a generator such as is used for electric power generation and the invention will be described in that environment but other applications are readily apparent. Observing FIG. 1, hydrogen gas is stored in container 10 at a pressure of about 30 psia and the hydrogen exits the container through line 12 where it is conveyed to the measuring meter 14 of this invention. After passing through meter 14 the gas exits through line 16 where it is passed to an internal jacket 18 surrounding an electrical generating unit 20. The jacket 18 is surrounded by a water jacket 22 and cooling water flows in from one side 24 and exits through outlet 26 in conventional manner. The hydrogen gas exits through outlet 28 at an elevated temperature and is propelled by pump 30 to a heat exchanger 32 and subsequently returned to line 16 and recirculated through line 34 to the generator.

Water flowing through jacket 22 is at some predetermined pressure and gas which is in jacket 18 is at some pressure greater than the pressure of the water in jacket 22. The purpose is to make sure that leaks in the wall separating the hydrogen gas and the water will result in hydrogen leaking from jacket 18 through the wall into the water rather than the other way around. The purpose is to keep water from any contact with the windings of the generator itself for the obvious reasons. The fact that the hydrogen gas also serves to cool the generator is an added benefit.

It is recognized that the small molecules of hydrogen will leak through small openings where gases of larger molecules would not leak. Therefore, a certain amount of loss in the gas is expected and does not necessarily indicate a break in the wall between the gas and water jackets. Thus, the gauges of the meter 14 will be calibrated to indicate the expected volume of flow based on an expected and an acceptable leakage. Where the volume of gas passing through meter 14 exceeds that amount, the meter and its associated apparatus will signal that the flow is too great and will indicate that something should be done to check the system.

Figure 3:
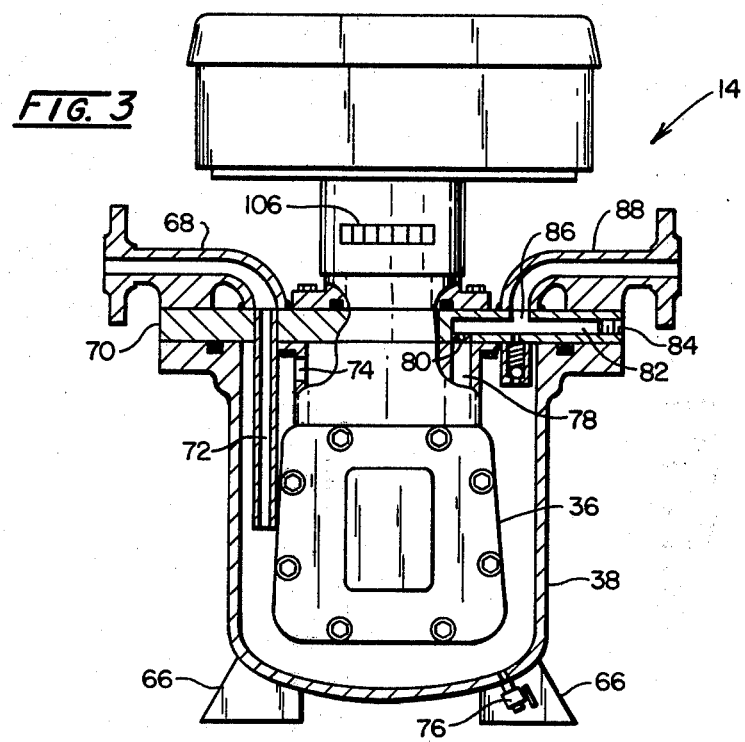
FIG. 3 is a partial sectional view taken along line 3—3 of FIG. 2.

Turning now to FIG. 3, the meter 14 involves a conventional meter housing 36 within a thick walled container 38.

For a fuller understanding of how gas meters work, FIGS. 4a–4d will be explained in their sequential operation. The schematic operation illustrated is of a bellows-type meter and it is recognized that alternate kinds of meters could be employed without departing from the spirit of the invention. The bellows-type meter is illustrated merely for a full understanding of the delicate nature of most of the small volume meters with which we are dealing in this invention.

Figure 4A:
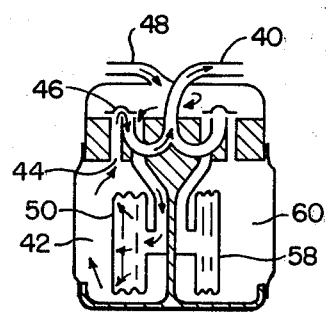
FIGS. 4a-4d illustrate a sequential operation of a bellows type positive displacement meter.
Figure 4B:
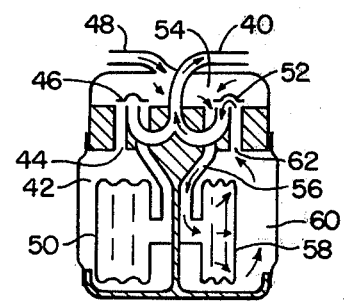

Looking specifically to FIG. 4a, gas flows through outlet 40 from chamber 42. The gas in chamber 42 is being compressed and forced out of the chamber through exit 44 past gate 46 due to the fact that inflowing gas from duct 48 is flowing into bellows 50. The expelled gas flows out through exit line 40 until the bellows 50 is filled with gas at which time there will be a shift of gates 46 and 52, see FIG. 4 B. When gate 46 shifts, it blocks the passage leading from the plenary chamber 54 into bellows 50 and the bellows 50 ceases to expand and passage 44 is blocked. The shifting of gate 52 opens passage 56 leading to the interior of bellows 58 which expands to drive the gas from chamber 60 out through passage 62 past gate 52 into the outlet 40.

Figure 4C:
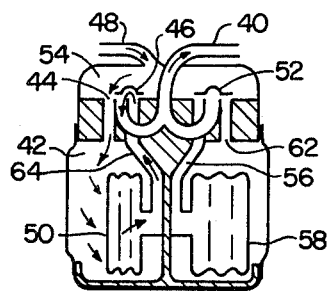

Looking into FIG. 4c, when bellows 58 is expanded to its fullest, the gates 46 and 52 again shift. Gate 52 blocks the passage 56 to the bellows 58 as well as passage 62. Gate 46 shifts to open the passage 44 to the gas within plenary chamber 54 and it flows into chamber 42 thereby expelling the gas from bellows 50 through passage 64, past gate 46 and through the exit duct 40.

Figure 4D:
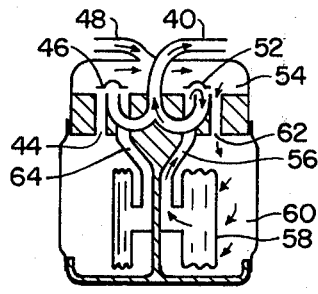

Again, the gates 46 and 50 shift to the positions shown in FIG. 4d where passages 64 and 44 are blocked by gate 46 and passage 62 is opened to the gas in plenary chamber 54. The gas flows into chamber 60 which compresses the bellows 58 thereby expelling gas through passage 56 past gate 52 into the exit duct 40. The system then repeats itself beginning back at FIG. 4a.

Figure 2:
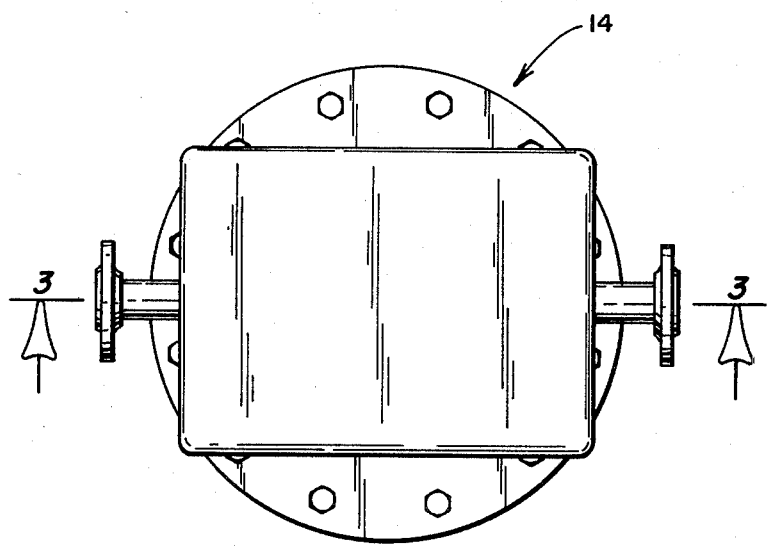
FIG. 2 is a top plan view of the housing for the measuring apparatus.

Looking again to FIG. 3, the heavy duty high-pressure container 38 is supported by a plurality of legs 66 to keep the container 38 out of contact with the floor or other support surface which may from time to time have water thereon. The support of the container 38 away from contact with the floor prevents corrosion of its surface to a certain extent. The inlet 68 for the container is welded or attached in some other fluid tight means to a plate 70 which is bolted or otherwise detachably connected to the container 38. FIG. 2 indicates the plate is bolted to container 38 and this is but one means for attachment but it is certainly a satisfactory means for connecting the two elements. Note, that an extension tube 72 extends the outlet of the gases into container 30 below the inlet 74 of the meter housing 36. Inherent in any fluid system is the transmission of droplets and solid particles of foreign matter which the designer of the equipment has no desire to transmit. The extension tube 72 serves to separate the entrained solid and liquid particles from the gas flowing into the chamber 38. Any droplets or solid particles will be directed toward the bottom of the container 38 and away from the inlet 74. Thereby, foreign matter will tend to collect in the bottom of container 38 and be drained off through a valve 76 located in the bottom of the container. The valve can be opened periodically for the drainage.

The inlet 74 leads to something like the inlet tube 48 of FIG. 4a and the gas will pass through the meter in conventional manner. It will be noted that the pressure outside the housing 36 is substantially the same as the gas pressure inside the meter 36 and therefore since the pressure differential is small, the meter will act in the same manner as it would act as if the container 38 was not present, the external pressure was atmospheric and the pressure drop across the meter was miniscule.

The outlet 78 from the meter 36 is essentially the equivalent of outlet duct 40 in FIG. 4a but it will be observed that a choke 80 is at the orifice which leads into the drilled passage 82 in plate 70. The size of the orifice in choke 80 is such as to restrict the outflow of hydrogen gas to not substantially greater than one hundred fifty ft.$^3$/hr. when the pressure at inlet 68 is thirty psia. Specifically the choke provides a circular orifice one-eighth inch in diameter. The drilled hole 82 is blocked by a threaded plug 84 and gas will exit hole 82 through an opening 86 which leads to an outlet duct 88. The choke 80 is designed to be of a specific size which will minimize the absolute rate of flow of the gas through the meter as stated. In this manner one can assure that the maximum flow will not be so great as to destroy the low-pressure, low-volume meter should a gross gas leak occur before the system is shut down.

The dial gauges on conventional gas meters as used in dwellings is familiar but those dials will be blocked from the view of the operator of the apparatus defined herein because the nature of the strength involved in container 38 dictates that it be opaque. Accordingly, special techniques and apparatus are used to ratchet the resulting volumetric information from the meter through the third of the three openings in plate 70 to a visual display 106 which may contain an alarm means which may be visual or audible to alert the operator when the volume flow exceeds the designated pre-determined amount.

Figure 5:
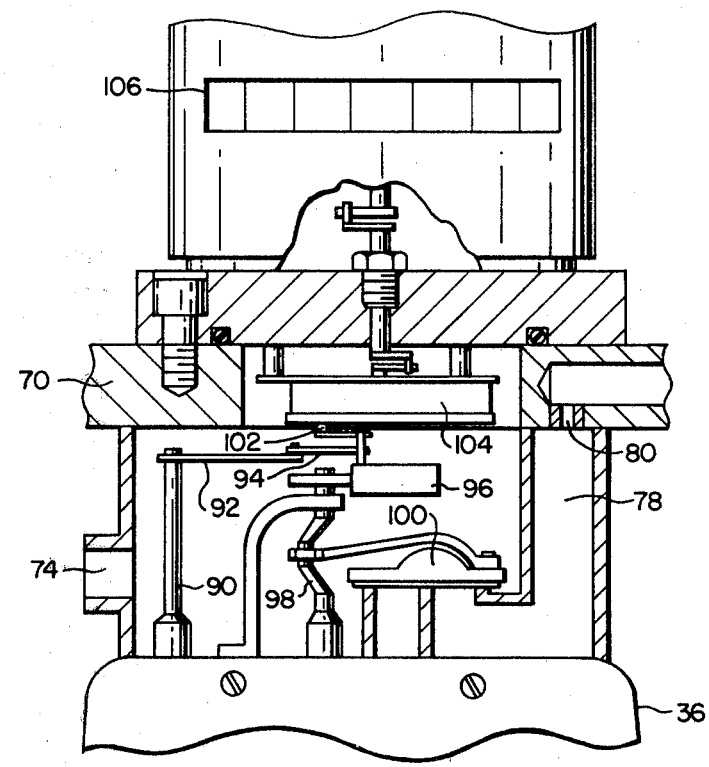
FIG. 5 is an enlarged elevational view of the gear and crank combinations of the measuring apparatus.

Specifically, observing FIG. 5, shaft 90 is associated with the internal measuring devise within the housing 36, shown as bellows in FIGS. 4a–d. The association reciprocates arms 92 and 94 which rotate lever 96 and crank 98. Rotation of crank 98 moves the valving 100 to control the sequential exit of the gas as described in FIGS. 4a–d.

Rotation of lever 96 also serves to rotate shaft 102 which leads to a gear box 104 which is calibrated to rotate at a rate translated to a visual display 106. Observe that shaft 102 is coaxial with the axis of rotation of crank 98.

Lever arm 96 is specifically designed to be temperature responsive. For example, if the gas within the container arrives cooler then the arm 96 will contract thereby shortening the reciprocating stroke of shaft 90 and arms 92 and 94. This in turn reduces the degree of expansion of the internal bellows so a smaller volume of gas is exhaled with each cycle. The purpose of the temperature responsive lever 96 is to deliver a specific proportion of a standard cubic foot of gas with each rotation even though the gas itself is not at standard temperature.

Turning again to FIG. 1, when the meter is first incorporated into the system it is important to minimize the initial impact. Accordingly a by-pass line 108 is included leading from inlet line 12 to outlet line 16. The following sequence should be employed to start and the reverse when the unit is being taken out of service:

(1) Inlet 110 and outlet 112 valves controlling flow to and from container 38 are closed.
(2) By-pass valve 114 is opened, to equalize pressure throughout the system.
(3) Open outlet valve 112 slightly to allow gas to leak back into the container 38 through choke 80.
(4) Open the inlet valve 110 slowly to allow the meter to start moving.
(5) Open the outlet valve 112 fully.
(6) Open the inlet valve 110 fully.
(7) Close the by-pass valve 114.

Note that the return line 34 from heat exchanger and by-pass line 108 are both connected to outlet line 16 at a point downstream of outlet valve 112.

Having thus described the invention, it will be clear to those having ordinary skill in the art that modifications may be made to the apparatus and combination of elements without departing from the spirit of the invention. It is not intended that the words used to describe the apparatus in any way be limiting on the invention, rather it is intended that the invention be limited only by the scope of the appended claims.

I claim:

1. In the combination of a source of gas at a pressure not substantially less than about 30 psia in fluid communication with a power generating unit and a means for measuring accurately the volumetric flow rate of said gas when said flow rate is as low as 0.2 ft$^3$/hr, a high pressure container including a plate which forms the top surface of said container, said plate including three openings leading into said container, said measuring means being mounted within said container and in fluid tight relationship with the underside of said plate the first said opening being in fluid communication with the source of gas, the second said opening being of a size to restrict the flow of gas from said container to not substantially greater than 150 ft$^3$/hr when the pressure of said gas at said first opening is 30 psia, the third opening being asscoiated with said measuring means and configured to allow the transmission of data from said measuring means to a signal means external of said container without substantial leakage of said gas from said container, said measuring means including an inlet, a flow path leading from said inlet to a positive displacement measuring means and subsequently to an outlet, said inlet being located within said container to minimize the possible entrance of foreign material into said measuring means inlet.

2. The combination of claim 1 wherein the signal means comprises a visual display of standard cubic feet of gas having passed through said measuring means.

3. The combination of claim 2 wherein the positive displacement measuring means includes a bellows and the exterior of said bellows is in contact with gas in said container which is at substantially the same pressure as the gas entering the chamber at the first opening.

4. The combination of claim 3 including a fourth opening in said container, said fourth opening serving as a drain for periodically removing foreign matter settling to the bottom of the container by gravity.

5. The combination of claim 4 including a by-pass line around the measuring means to connect the source of gas directly with the power generating unit.

6. The combination of claim 1 wherein the signal means comprises at least one of a visual signal and an audio signal for indicating when a predetermined amount of gas has exited the high pressure container through the second opening.

7. The combination of claim 1 wherein the power generating unit comprises an electric power generator partially encompassed within a fluid tight liquid jacket which serves to cool the generating unit, the source of gas being in fluid communication with a fluid tight enclosure encompassed by the water jacket, the pressure of the gas within the enclosure being greater than the pressure of the liquid to thereby insure that any leak in the liquid jacket in contact with the gas will cause the gas to leak into the liquid jacket and prevent liquid leakage.

8. The combination of claim 7 wherein the positive displacement measuring means includes a bellows and the exterior of said bellows is in contact with gas in said container which is at substantially the same pressure as the gas entering the chamber at the first opening.

9. The combination of claim 7 including an extension leading from the first opening in said container toward the lower portion thereof, said extension terminating below the inlet to said measuring means.

10. The combination of claim 1 including an extension leading from the first opening in said container toward the lower portion thereof, said extension terminating below the inlet to said measuring means.

11. The combination of claim 1 wherein the positive displacement measuring means includes a bellows and the exterior of said bellows is in contact with gas in said container which is at substantially the same pressure as the gas entering the chamber at the first opening.

12. The combination of claim 1 including a by-pass line around the measuring means to connect the source of gas directly with the power generating unit.

* * * * *